Jan. 8, 1946.   S. V. MADDOX   2,392,606
MILLING AND LIKE MACHINE
Filed Aug. 29, 1944   2 Sheets-Sheet 1
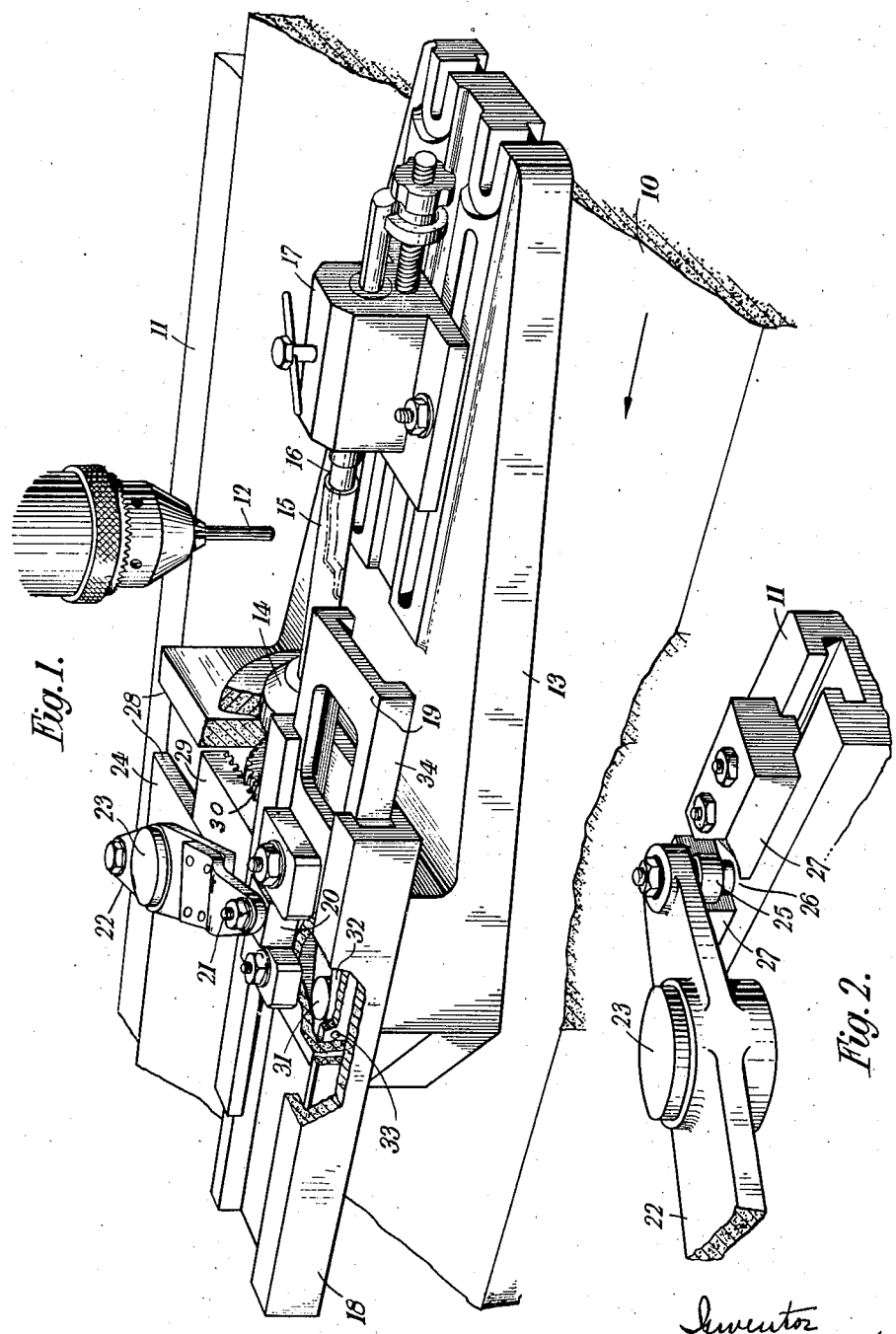

Patented Jan. 8, 1946

2,392,606

UNITED STATES PATENT OFFICE 2,392,606

MILLING AND LIKE MACHINE

Stanley Victor Maddox, Cheylesmore, Coventry, England, assignor to H. M. Hobson (Aircraft & Motor) Components, London, England Application August 29, 1944, Serial No. 551,708
In Great Britain January 1, 1944

7 Claims. (Cl. 90—13.9)

The object of this invention is to adapt a milling or like machine of the kind having a rotary milling cutter or grinding tool which is fixed in space and a movable work-supporting table for traversing the work past the cutter, in such a way as to enable it to form lands of predetermined shape on a cylindrical workpiece. Such adaptation is required for the manufacture of scroll valves of the kind described in my copending application Serial No. 551,703.

The adapted milling machine according to the invention comprises a shoe carried by the table, means for effecting progressive displacement of the shoe in relation to the table as the latter travels along the machine bed, a member movable in relation to the table and serving to import rotary movement to one of the work-holding chucks, and a cam and follower, one carried by the shoe and the other by said member, for imparting to said member a variable movement to rotate the work determined by the shape of the cam.

One form of milling machine, adapted in accordance with the invention for cutting the lands of scroll valves of the kind described in application Serial No. 551,703, will now be described in detail with reference to the accompanying drawings, in which:

Fig. 1 is a perspective view of the relevant parts of the machine,

Fig. 2 is an enlarged perspective view of part of the magnifying lever,

Figure 4:
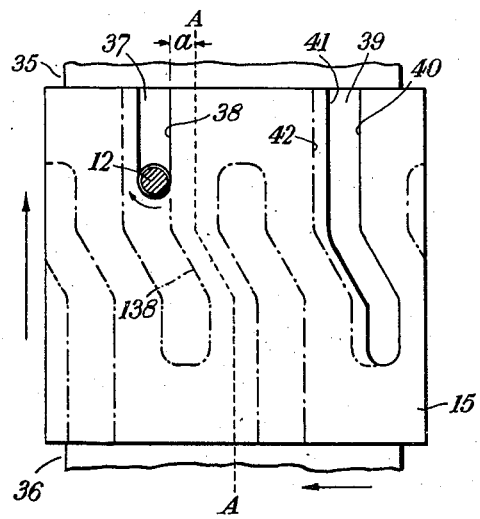
Fig. 4 is a diagram, showing a development of the scroll valve and illustrating how the lands are cut.

The table 10 of the milling machine receives a reciprocating movement in the direction of the arrow in Fig. 1, relatively to a fixed structure 11, and to a rotating milling cutter 12 which remains fixed in space. To the table 10 is attached a fixture 13 carrying a chuck 14 mounted in bearings with its axis parallel to the direction of traverse of the table. The work which consists of a hollow cylinder 15, in which are to be milled lands of scroll form as later described, is supported by the chuck 14 and by a centre 16 carried by a tailstock 17.

To the fixture 13 are attached guides 18 for a shoe 19, which is slidable in relation to the guides in the direction of traverse of the table. To a block 20 mounted on the shoe 19 is pivoted at 21 one end of a lever 22. The lever 22 is pivoted centrally on a stud 23 attached to an upstanding bracket 24 on the fixture 13. At its far end the lever 22 carries a roller 25 which engages in a slot 26 (Fig. 2) defined by two guide members 27 mounted on the fixed structure 11. As the fixture 13 reciprocates with the table 10 relatively to the fixed structure 11, the shoe 19 is thus reciprocated in relation to the fixture, the lever 22 turning about its central pivot 23. The lever 22 is so proportioned that the shoe 19 receives a traverse of greater amplitude than the table 10 and fixture 13.

Figure 3:
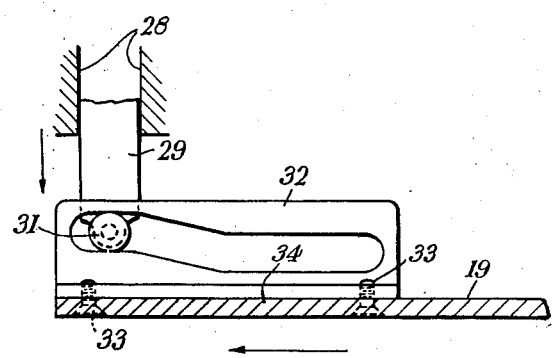
Fig. 3 is a plan view of the roller and associated cam.

In the bracket 24 are formed guides 28 for a rack 29 engaging a gear wheel 30 attached to the spindle of the chuck 14. Reciprocation of the rack 29 in its guides 28, in a direction transverse to the direction of traverse of the table, is thus effective to rotate the chuck. Such reciprocating movement is communicated to the rack 29 by a roller 31 fixed to it and engaging a cam 32 detachably secured by screws 33 to a flange 34 on the shoe 19 (Fig. 3). The extent of rotary movement imparted to the chuck 14 per unit of traverse of the table is thus determined by the contour of the cam 32.

The valve blank 15 is to be formed with lands of scroll form defining between them grooves, shown in chain-dotted lines in Fig. 4, which terminate alternately in annular recesses 35, 36 at opposite ends of the valve and are closed at their other ends.

The scroll cutting process is as follows:

A cam 32 of the appropriate contour is attached to the shoe 19. A valve blank 15 is inserted in the chuck 14, and the tailstock 17 adjusted to engage the centre of the blank. The cutter 12 is lowered into the blank for the required depth and the cutting edge offset from the centre line A—A of the land to be formed by an amount $a$ equal to half the width of the land. The machine table 10 is then set in motion and this causes the fixture 13 and parts carried thereby to move with the table 10 in relation to the cutter, in the direction indicated by the vertical arrow in Fig. 4, except the one end 25 of the lever 22 which is located between the guides 27 on the fixed part of the machine. The lever will turn about its pivot 23, thus causing the shoe 19, to which the cam 32 is attached, to move along its guides and so traverse the cam past the roller 31 on the rack 29. The cam contour will impart a linear motion to the rack 29, thus causing the chuck 14, and so the valve blank 15, to rotate in the required direction, indicated by the horizontal arrow in Fig. 4, and through the desired angle.

In Fig. 4, the cutter is shown as having partially cut into the blank a groove 37, the right hand side 38 of which defines the left hand edge of the land, the centre line of which is A—A. The blank has, up to the stage illustrated, received no rotation from the cam, the portion of the edge 38 of the land so far cut extending axially of the blank. As indicated, however, the motion thereafter imparted by the cam to the rack, effects rotation of the blank such that the continuation of the edge 38 is of the form shown by the chain-dotted line 138.

In Fig. 4, the reference 39 shows the complete recess formed by the cutter in shaping the left hand edge 40 of another of the lands. The circumferential distance of the line 41, defining the left hand edge of the recess 39, from the chain-dotted line 42, is not constant throughout the length of the recess. It is clear therefore that, in order to cut the right hand side of a land, corresponding to chain-dotted line 42, it is necessary to use a cam of different contour from that used for cutting the left hand sides of the lands exemplified by the lines 38, 40. To cut these right sides therefore, the cam 32 is detached from the shoe by undoing the screws 33, and replaced by a cam of the appropriate contour, whereupon the sequence of operations is repeated.

It will be understood that, if desired, the milling cutter can be replaced by a grinding tool, and that the expressions "milling machine and milling cutter" in the appended claims are to be construed as including respectively a grinding machine and a grinding tool.

What I claim as my invention and desire to secure by Letters Patent is:

1. A milling machine, comprising a rotary milling cutter which is fixed in space, a machine bed, a work-supporting table which is movable in relation to the machine bed in a plane normal to the axis of rotation of the cutter to traverse the work past the cutter, a work-holding chuck mounted on the table, a shoe slidably mounted on the table, means for effecting progressive displacement of the shoe in relation to the table as the latter travels along the machine bed, a member movable in relation to the table and serving to impart rotary movement to the work-holding chuck, and a cam and follower, one carried by the shoe and the other by said member for imparting to said member a variable movement to rotate the work, which movement is determined by the shape of the cam.

2. A milling machine, comprising a rotary milling cutter which is fixed in space, a machine bed, a work-supporting table which is movable in relation to the machine bed in a plane normal to the axis of rotation of the cutter to traverse the work past the cutter, a work-holding chuck mounted on the table, a shoe slidably mounted on the table, means for effecting progressive displacement of the shoe in relation to the table as the latter travels along the machine bed, a rack mounted on the table for sliding movement in a direction transverse to the direction of traverse of the table, a gear wheel associated with the chuck engaging the rack and serving to rotate the chuck on reciprocation of the rack, and a cam and follower, one carried by the shoe and the other by the rack, for reciprocating the rack as the shoe moves in relation to the table.

3. A milling machine, comprising a rotary milling cutter which is fixed in space, a machine bed, a work-supporting table which is movable in relation to the machine bed in a plane normal to the axis of rotation of the cutter to traverse the work past the cutter, a work-holding chuck mounted on the table, a shoe carried on the table, means for effecting sliding movement of the shoe in relation to the table in the direction of traverse of the table as the latter travels along the machine bed the amplitude of movement of the shoe relatively to the table exceeding the amplitude of movement of the table in relation to the machine bed, a member movable in relation to the table and serving to impart rotary movement to the work-holding chuck, and a cam and follower, one carried by the shoe and the other by said member for imparting to said member a variable movement to rotate the work, which movement is determined by the shape of the cam.

4. A milling machine, comprising a rotary milling cutter which is fixed in space, a machine bed, a work-supporting table which is movable in relation to the machine bed in a plane normal to the axis of rotation of the cutter to traverse the work past the cutter, a work-holding chuck mounted on the table, a shoe carried on the table, means for effecting sliding movement of the shoe in relation to the table in the direction of traverse of the table as the latter travels along the machine bed, a rack mounted on the table for sliding movement in a direction transverse to the direction of traverse of the table, a gear wheel associated with the chuck engaging the rack and serving to rotate the chuck on reciprocation of the rack, and a cam and follower, one carried by the shoe and the other by the rack, for reciprocating the rack as the shoe moves in relation to the table.

5. A milling machine, comprising a rotary milling cutter which is fixed in space, a machine bed, a work-supporting table which is movable in relation to the machine bed to traverse the work past the cutter, a work-holding chuck mounted on the table, a shoe carried on the table for sliding movement thereon in the direction of traverse of said table, a lever pivoted at one end to the shoe and intermediately to the table, means for restraining the other end of said lever against movement with the table as the latter moves along the machine bed, a rack mounted on the table for sliding movement in a direction transverse to the direction of traverse of the table, a gear wheel associated with the chuck engaging the rack and serving to rotate the chuck on reciprocaton of the rack, and a cam and follower, one carried by the shoe and the other by the rack for reciprocating the rack as the shoe slides in relation to the table.

6. A metal working machine, comprising a rotary cutting tool which is fixed in space, a machine bed, a work-supporting table mounted to slide on the machine bed to traverse the work past the cutting tool, said table moving in a plane normal to the axis of rotation of said tool, a work-holding chuck mounted on the table, a shoe carried on the table, means for effecting sliding movement of the shoe in relation to the table in the direction of traverse of the table as the latter travels along the machine bed, a reciprocating member movable in relation to the table in a direction transverse to the direction of travel thereof, and serving when so moved to rotate the chuck relatively to the table, and a cam and follower, one carried by the shoe and the other by said reciprocating member, for reciprocating said member as the shoe moves in relation to the table.

7. A metal working machine, comprising a rotary cutting tool which is fixed in space, a machine bed, a work-supporting table mounted to slide on the machine bed to traverse the work past the cutting tool, said table moving in a plane normal to the axis of rotation of said tool, a work-holding chuck mounted on the table, a shoe carried on the table, means operating automatically on traverse of the table to effect a sliding movement of the shoe in relation to the table in the direction of traverse thereof, said sliding movement being of greater amplitude than the movement of traverse of the table, a rack bar mounted on the table to slide thereon in a direction transverse to the direction of movement of the shoe, a cooperating gear wheel on the chuck, a cam on the shoe, and a cooperating follower on the rack bar for reciprocating the rack bar and rotating the chuck, the path of the movement of the work in relation to the tool corresponding on a reduced scale to the contour of the cam.

STANLEY VICTOR MADDOX.